UNITED STATES PATENT OFFICE.

MARCUS GUGGENHEIM, OF BASEL, AND ERNST HUG, OF RIEHEN, NEAR BASEL, SWITZERLAND, ASSIGNORS TO THE HOFFMANN-LA ROCHE CHEMICAL WORKS, OF NEW YORK, N. Y., A CORPORATION OF NEW YORK.

ETHANOL-TRIALKYL-ARSONIUM HYDROXIDS AND PROCESS OF MAKING THE SAME.

1,308,414. Specification of Letters Patent. Patented July 1, 1919.

No Drawing. Application filed December 8, 1916. Serial No. 135,355.

*To all whom it may concern:*

Be it known that we, MARCUS GUGGENHEIM, residing at Basel, Switzerland, and ERNST HUG, residing at Riehen, near Basel, Switzerland, both citizens of Switzerland, have invented a certain new and Improved Ethanol-Trialkyl-Arsonium Hydroxids and Process of Making the Same, of which the following is a specification.

This invention relates to a process for making ethanol-trialkyl-arsonium-hydroxids and their salts, and to the products of the process, and consists mainly in causing trialkyl-arsin, such as trimethyl- or triethyl-arsin, and halogen substitutes of ethyl-alcohol, such as glycol-chlorhydrin or glycol-bromhydrin, to act upon one another at elevated temperatures.

The ethanol-trialkyl-arsonium-hydroxids and their salts are intended to be used for therapeutical purposes.

We proceed as follows:

18 parts of trimethyl-arsin $(As\equiv(CH_3)_3)$, 20 parts of glycol-chlorhydrin $(CH_2Cl-CH_2OH)$ are mixed and heated to a temperature of 120–125° C. for a period of about 4 hours. The product which is partially solidified is then taken up with alcohol, and after concentration of the solution ether is added to precipitate the ethanol-trimethyl-arsonium-chlorid. From this chlorid $(AsC_2H_4OH(CH_3)_3Cl)$ the free base can be obtained with the aid of silver oxid.

The ethanol-trimethyl-arsonium-hydroxid $(C_2H_4OHAs(CH_3)_3OH)$ which is one of our new products and is one of the ethanol-trialkyl-arsonium-hydroxids is a syrup-like substance which partially crystallizes and has an odor resembling that of trimethyl-arsin; it is easily soluble in water and alcohol but insoluble in ether; it forms very characteristic salts with acids, the chlorid for instance forms beautiful crystals, melts at 220° C., is very hygroscopic, easily soluble in alcohol, insoluble in ether.

If glycol-bromhydrin instead of glycol-chlorhydrin be used, we proceed as follows:

10 parts of trimethyl-arsin $(As\equiv(CH_3)_3)$, 15 parts of glycol-bromhydrin $(CH_2Br-CH_2OH)$ are allowed to react upon each other at a temperature of 125° C. for 4 hours. To obtain therefrom the ethanol-trimethyl-arsonium-hydroxid in its chemically pure form the same method is applied as described in the case where the glycol-chlorhydrin was used.

If instead of trimethyl-arsin we should use triethyl-arsin we proceed as follows:

9 parts of triethyl-arsin $(As\equiv(C_2H_5)_3)$ and 10 parts of glycol-chlorhydrin $(CH_2Cl-CH_2OH)$ are allowed to react upon each other at a temperature of 120° to 125° C. for four hours. The chlorid so obtained is taken up with amyl alcohol, and after concentration of the solution the ethanol-triethyl-arsonium-chlorid is precipitated by addition of ether. The free base, ethanol-triethyl-arsonium-hydroxid which also is an ethanol-trialkyl-arsonium-hydroxid can be obtained from the chlorid by the action of silver oxid.

The ethanol-triethyl-arsonium-hydroxid $(C_2H_4OHAs(C_2H_5)_3OH)$ shows qualities similar to those of the ethanol-trimethyl-arsonium-hydroxid just as the corresponding salts of the two bases are very much alike.

In our application, Serial No. 135,354, we describe a process of making ethanol-trialkyl-arsonium-hydroxids by treating trimethyl-arsin with ethylene dibromid while the present application is directed to the use of glycol halogen hydrins, as above described.

We claim:

1. An ethanol-trialkyl-arsonium-hydroxid substantially as described.

2. As a new article of manufacture the chemical product ethanol-trimethyl-arsonium-hydroxid.

3. The process of making an ethanol-trialkyl-arsonium-halid which comprises treating a tri-alkyl-arsin with glycol-halogen-hydrin, substantially as and for the purpose described.

4. The process of making ethanol-trialkyl-arsonium-hydroxid which comprises treating a tri-alkyl-arsin with glycol-halogenhydrin and then treating the resulting halid with silver oxid, substantially as and for the purpose described.

5. The process of making ethanol-tri-methyl-arsonium-hydroxid which comprises treating tri-methyl-arsin with glycol chlorhydrin, precipitating the chlorid thus formed, and treating the chlorid with silver oxid, substantially as and for the purpose described.

In witness whereof we have hereunto set our hands.

MARCUS GUGGENHEIM.
ERNST HUG.